(No Model.)
T. F. HENNESY.
VELOCIPEDE.
No. 327,084. Patented Sept. 29, 1885.
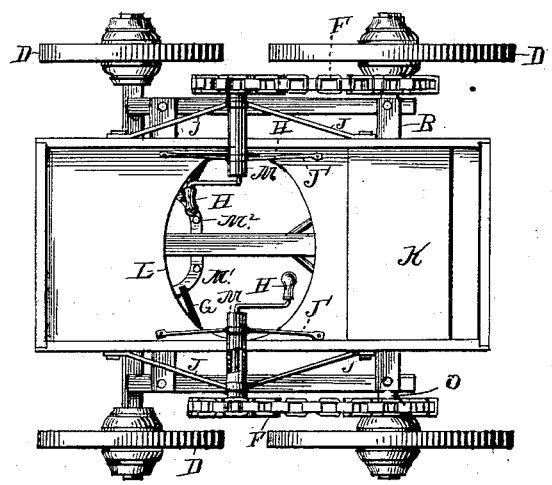
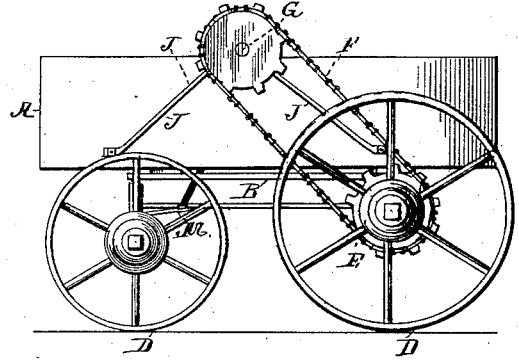
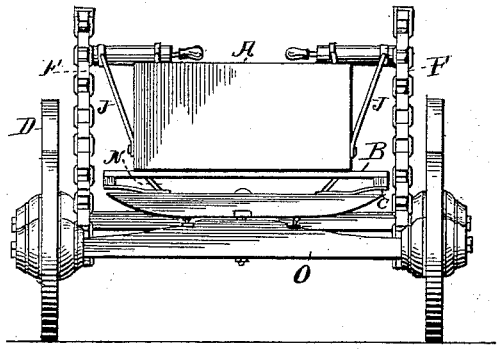
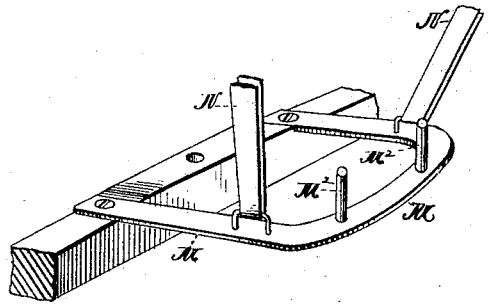
WITNESSES:
Norris A. Clark.
R. W. Bishop.
INVENTOR
Thomas F. Hennesy
By R. S. & A. Lacey,
Attys

UNITED STATES PATENT OFFICE.

THOMAS F. HENNESY, OF SOUTH KAUKANNA, WISCONSIN, ASSIGNOR OF ONE-HALF TO LOUIS GANTTER, OF SAME PLACE.

VELOCIPEDE.

SPECIFICATION forming part of Letters Patent No. 327,084, dated September 29, 1885.

Application filed July 10, 1885. (No model.)

*To all whom it may concern:*

Be it known that I, THOMAS F. HENNESY, a citizen of the United States, residing at South Kaukanna, in the county of Outagamie and State of Wisconsin, have invented certain new and useful Improvements in Four-Wheeled Vehicles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in four-wheeled vehicles, and is designed to produce a hand-propelled carriage which can be easily operated, and which will be especially convenient to those persons who are always moving from place to place—such as commercial travelers, agents, &c.

It consists in certain novel features of construction and in the combination and arrangement of the several parts, as hereinafter fully described, and specifically pointed out in the claims.

In the accompanying drawings, Figure 1 is a plan view of my improved vehicle. Fig. 2 is a side elevation, and Fig. 3 an end elevation of the same; and Fig. 4 is a detail perspective view of the steering device.

A is the carriage-body, which is supported upon a platform, B, which is in turn supported upon the axles by the springs C. The wheels D are made in the ordinary manner and of the usual relative sizes. The back wheels may be traction-wheels; but this is not essential to the proper working of my invention.

Upon the rear axle, O, at its opposite ends and between the vehicle-body and the rear wheels, I mount sprocket-wheels E, and connect them by sprocket-chains F to the sprocket drive-wheels G. The axles G' of the drive-wheels G are extended inward and their ends are provided with the crank-handle H. The extended portions of the drive-wheel axles G' are inserted through and held by sleeves I I, which are supported by brace-rods J J', secured to the vehicle-body, as shown, the brace-rods J being secured to the outside of the side rail of the body, and the brace-rods J' to the floor of the body.

K is the seat, placed within easy reach of the crank-handles H. The seat may be adjustable to and from the crank-handles, if so desired. In front of the seat K, I form the hole or opening L through the floor of the vehicle-body.

To the front axle I secure the ends of the U-shaped flat bar or foot-rest M, the rounded portion of which, M', extends back far enough to be easily reached by the operator's feet when they are placed through the opening L in the operation of the device. The portion M' of the foot-rest is provided with two pins, $M^2 M^2$, against which the operator's feet bear in the operation of the device. The side pieces of the U-shaped bar have attached thereto one end of a rubber strap or coiled spring, N, the other end of which is secured to the bottom of the vehicle-body.

The vehicle is operated by turning the crank-handles H H, which will cause the drive-wheels G to revolve and communicate their motion to the sprocket-wheels E, which will cause the rear carriage-wheels to revolve and carry the vehicle forward. The machine is steered by means of the U-shaped bar M, which is turned to one side or the other, as may be desired, by the operator pushing against one or the other of the pins $M^2$ with his feet. The tension of the springs N will keep the front wheels in a straight line with the rear wheels, unless acted upon by some force, and as soon as the force is removed will bring them back to their normal position, as will be understood.

By placing the vehicle-body on the spring-supported platform B, I prevent the slipping off and consequently the losing of the sprocket-chains. When the machine is not in use, the springs C will force the body A upward enough to hold the sprocket-chains taut. The weight of the load when the machine is in use will depress the body sufficient to give the slack necessary to the successful operation of the sprocket-chains.

The space under the seat and in front of the hole L can be utilized for the storage and transportation of baggage, merchandise, &c., as will be readily understood.

Having thus described my invention, what I claim, and desire to secure by Letters Patent, is—

1. In a vehicle, the combination of the axle O, sprocket gear-wheels E, keyed to each end thereof, sleeves I, supported by brace-rods J J', parallel with the axle O, drive-wheel axles G', supported within said sleeves, sprocket drive-wheels G, carried by said axles on their outer ends, cranks H, secured to their inner ends, and the sprocket-chains F, passing over the wheels G and E, substantially as and for the purposes specified.

2. The combination, with the running-gear and body of a vehicle, of a U-shaped bar having its legs attached to the front axle, one on either side of the point around which the axle turns, pins extending upward from that portion of the bar uniting the legs, yielding supports connecting the outer portion of the bar with the vehicle-body, the parts being constructed, arranged, and operating substantially as shown, and for the purposes specified.

In testimony whereof I affix my signature in presence of two witnesses.

THOMAS F. HENNESY.

Witnesses:
W. T. ALBERS,
J. O. FEREND.